April 1, 1952 W. D. SANSOM 2,591,014
COMBINED THINNING AND SHAPING SCISSORS
Filed Sept. 12, 1950
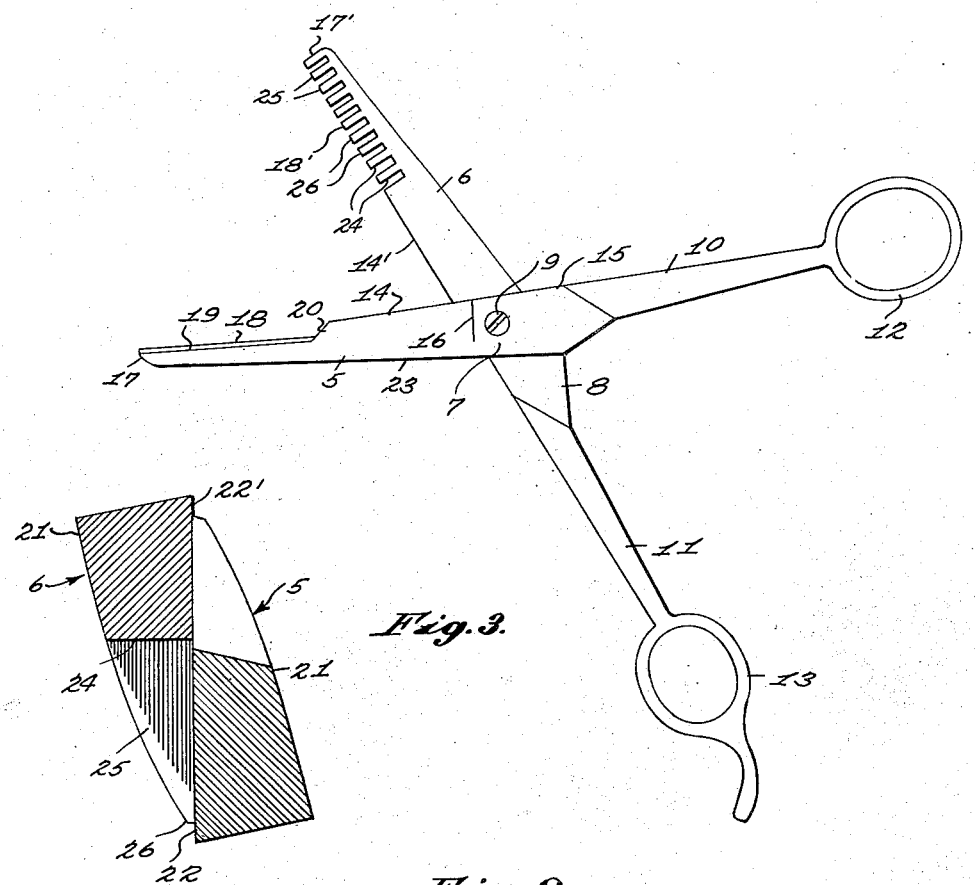
Fig. 1.
Fig. 3.
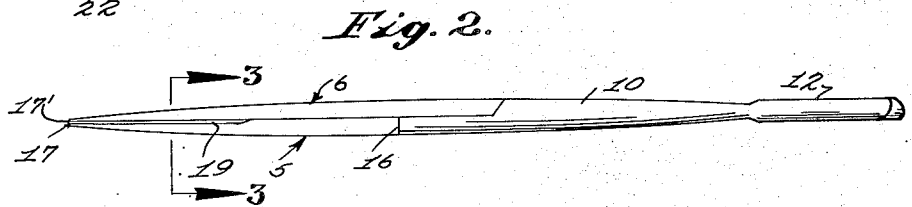
Fig. 2.
INVENTOR.
WILLIAM D. SANSOM
BY
McMorrow, Berman & Davidson
ATTORNEYS Patented Apr. 1, 1952

2,591,014

UNITED STATES PATENT OFFICE 2,591,014

COMBINED THINNING AND SHAPING SCISSORS

William D. Sansom, Detroit, Mich.

Application September 12, 1950, Serial No. 184,441

2 Claims. (Cl. 30—195)

This invention relates to improvements in scissors or shears for thinning and shaping hair, and more particularly to a combined thinning and shaping scissors, the primary object of the invention being to provide a practical and efficient unitary device of this kind which eliminates the need for separate thinning and shaping scissors or shears, and which saves time and effort on the part of an operator in thinning and shaping hair by eliminating the laying down and picking up of separate thinning and shaping shears which is otherwise necessary.

Another important object of the invention is to provide a simple and relatively inexpensive combined device of the character indicated above in which the efficiency and accuracy of thinning and shaping operations are not curtailed by the combining of thinning and shaping sections in one scissors or shears.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views:

Figure 1 is a plan view, showing the embodiment in open position;

Figure 2 is an edge elevation; and

Figure 3 is an enlarged transverse vertical section, taken on the line 3—3 of Figure 2.

Referring in detail to the drawings, the illustrated combined thinning and shaping shears or scissors comprise shearing blades 5 and 6 having flat inner end portions 7 and 8, respectively, which are crossed and in side-by-side engagement and are pivoted together by means of a pivot screw 9. The inner end blade portions 7 and 8 terminate in laterally offset handle portions 10 and 11, respectively, which are straight and have finger loops 12 and 13, respectively, on their outer ends. The handle portions 10 and 11 are substantially in axial alignment with the cutting edges of the blades 5 and 6, respectively.

The blade 5 has a longitudinal shaping edge 14 which is straight and is aligned with the edge 15 of the associated end portion 7. The shaping edge 14 extends longitudinally away from the point 16 for a distance about half-way to the blunt outer end 17 of the blade. At the outer end of the shaping edge 14, the blade 5 has a thinning edge 18 which is parallel to the shaping edge 14, but offset laterally with respect to the shaping edge. As shown in Figure 1, the thinning edge 18 is beveled at the outer side through its length, as indicated at 19, the bevel 19 terminating at a diagonal edge or surface 20 extending outwardly from the outer end of the shaping edge 14.

As indicated in Figures 2 and 3, the blade 5 is segmental in cross-section, and has a convex outer side 21 and a plane flat inner side or face 22, the inner side being coplanar with the inner side of the related inner end portion 7 and continuous therewith, and the outer side 21 extending outwardly along the blade from the point 16 to the end 17 thereof. As shown in Figure 1, the back edge 23 of the blade 5 is straight and continuous and tapers toward the outer end 17 with respect to the shaping and thinning edges of the blade 5.

The blade 6 is similar to the blade 5, and has a similar shaping edge 14', but taking the place of the thinning edge 18 is the notched edge 18' which is not offset like the thinning edge 18, but which extends the full width of the blade 6 and to its outer end 17'. The notched edge 18' is formed with notches 24 spaced therealong to define teeth 25 having laterally outward ends or edges 26 which cooperate with the inner side or face 22 of the blade 5 when the blades 5 and 6 are closed together, whereby hairs engaged with the teeth ends 26 will be cut and hairs positioned in the notches 24 will be uncut.

As indicated in Figures 1 and 3, the blade 6 has a convex outer side 21' and a plane flat inner side or face 22' similar to the outer and inner faces of the blade 5, and the inner faces 22 and 22' are arranged to engage each other in a usual shearing relation when the blades 5 and 6 are closed together. As shown in Figure 3, the intersections of the curved outer faces 21 and 21' thereof define the cutting edges of the various edge portions or sections.

In the use of ordinary shaping shears, only limited portions of the cutting edges thereof near the intersection of the blades corresponding to the shaping edges 14 and 14' of the present invention, are used in cutting the hair at an angle to produce tapered tuft ends, the shears being used in a "slithering" motion to achieve this result. In the use of ordinary toother thinning shears, only outer end portions of the blades thereof, corresponding to the thinning edges 18 and 18' of the present invention, are employed. Hence, by combining the two sets of edges, and in doing providing both shaping and thinning edges of effective length in a single shears or scissors, the effectiveness and efficiency of the two separate shears have been preserved and combined in a single shears or scissors. With the present combined shears the operations of shaping and thinning can be rapidly and accurately alternated when desirable, without the delay and labor of laying down one shears and picking up the other alternately which is involved in using an ordinary shaping shears and ordinary thinning shears. Further, the combined shears cost less than separate shears and can be stored and shipped in less space and at less expense, and takes up less space in the operator's tray. It is also possible with the combined shears to simultaneously shape and thin adjacent portions of the hair.

I claim:

1. In a combined hair-shaping and thinning shears, a pair of blades having crossed longitudinally inward end portions formed with handles, pivot means traversing said inward end portions and securing said blades together in side-by-side shearing relation, said blades having confronting cutting edges extending longitudinally therealong, each of said cutting edges being divided intermediate the ends thereof to define a shaping edge and a thinning edge, the thinning edge on one of said blades being plane and laterally offset with respect to the longitudinal axis of the shaping edge thereof, and the thinning edge on the other blade having spaced teeth therealong arranged to adapt a shearing relation to the thinning edge on said one blade when the blades are closed together.

2. In a combined hair-shaping and thinning shears, a pair of blades having crossed longitudinally inward end portions formed with handles, pivot means traversing said inward end portions and securing said blades together in side-by-side shearing relation, said blades having confronting cutting edges extending longitudinally therealong, each of said cutting edges being divided intermediate the ends thereof to define a shaping edge and a thinning edge, the thinning edge on one of said blades being plane and laterally offset with respect to the longitudinal axis of the shaping edge thereof, and the thinning edge on the other blade having spaced teeth therealong arranged to adapt a shearing relation to the thinning edge on said one blade when the blades are closed toegther, the shaping edges of the blades being located adjacent to the inward end portions thereof and the thinning edges of the blades being located between the shaping edges and the opposite ends of the blades.

WILLIAM D. SANSOM.

REFERENCES CITED

The following references are of record in the file of this patent:

UNITED STATES PATENTS

| Number | Name | Date |
|---|---|---|
| 756,818 | Benton | Apr. 12, 1904 |
| 2,083,483 | Strezoff | June 8, 1937 |

FOREIGN PATENTS

| Number | Country | Date |
|---|---|---|
| 552,139 | Germany | June 9, 1932 |